Patented Sept. 23, 1941

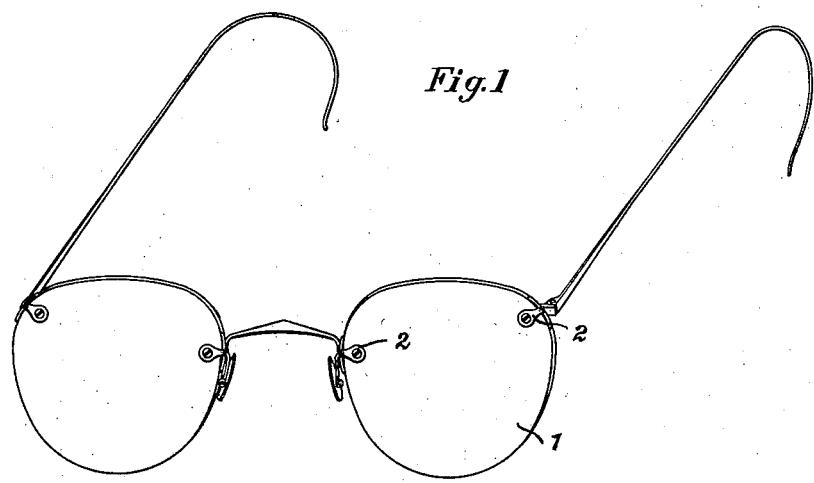
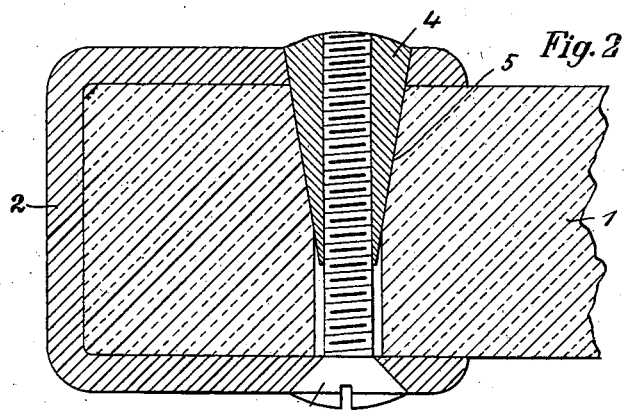
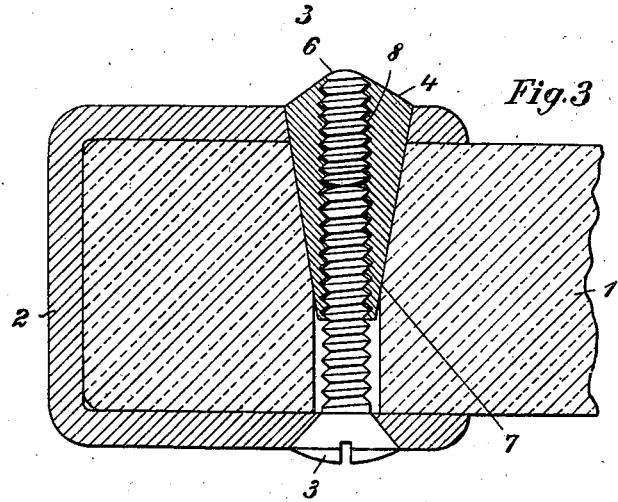

2,256,846

UNITED STATES PATENT OFFICE 2,256,846

OPHTHALMIC MOUNTING

Willi Lohmann, Berlin-Wilmersdorf, Germany

Application May 16, 1940, Serial No. 335,643
In Germany May 24, 1939

1 Claim. (Cl. 88—47)

In rimless spectacles or eye glasses it is necessary to make holes in the glasses in order that the frame elements, that is the bow resting on the nose and the temple bars, can be fixed. These elements have clamps which engage over the edge of the glass at the pierced points and have screw-threaded holes for the fixation screws. For securing their position on the glass edge the elements have flaps which bear from the outer side against the glass edge.

Up to the present it has not been possible to connect the frame elements with the glasses so that they are permanently solidly fixed on the glasses. Very soon the frame elements become loose, wherefrom results that the screw can move in the corresponding hole and rub on the wall of the hole. The glass exerts on the screw a rubbing action like emery paper owing to the hardness of the glass and the roughness of the wall of the hole, and very soon the screw thread is completely ground off. The fitting of the glass in the direction of its plane is lost thereby, the glasses are no longer securely held in the frame elements and assume when used an inclined position. This not only does not look well, but the optical effect is considerably impaired because the glasses are decentered relative to the eyes.

Numerous propositions have been made to obviate this inconvenience. Some of these propositions were intended to increase the pressure of the clamp arms on to the surface of the glasses, for instance by making one of the clamp arms thicker in order that the number of screw-threads for the screw could be increased. Such endeavours failed, however, for the reason that at the strong stressing of the clamp connection, for instance when wiping the glasses, the bearing surfaces of the clamp were rubbed off. It has further been proposed to exert a lateral pressure upon the glasses by the special construction of the arms of the clamp bearing against the glass edge in order to securely hold the glasses between the clamp arms and screw. Hereby the clearance of the screw in the hole pierced in the glass is not avoided and, as the clamp connection is always somewhat springy, the grinding off of the screws was not prevented. The employment of filling pins or filling sleeves for the holes pierced in the glass and eccentrically mounted in the arms of the clamps was intended for the same object. These propositions have not been adopted already owing to their complicated and expensive production. Finally it has been proposed to fill the pierced holes in the glasses with insertions of cement, rubber, tin foil or the like, but the result was merely attained that the screw worked in the insertions instead of in the hole itself. A rubbing off of the screw could be prevented, but the insertions were ground out instead. Such propositions possess further the inconvenience that the screw or the female screw thread was excessively stressed at the necessary pressing together of the insertions.

According to the invention a secure seat of the frame elements on rimless spectacles or eye glasses is obtained by giving to the pierced hole in the glass a conical shape at one end and by using a corresponding conical nut extending through the clamp of the frame, said nut being drawn by the screw into the conical bore until it tightly bears against the inner wall of the hole pierced in the glass. The smooth outer wall of the nut bears then against the whole circumference of the wall of the pierced hole, so that this hole is completely filled and the effects from friction are very much reduced. Owing to the length of the nut the turns of the screw-thread destined to hold the screw are increased, and finally it is made possible to easily readjust the screw as at retightening of the screw the nut is again pulled into the pierced hole in case it should have become loose. The arrangement according to the invention presents further advantages at the fitting of the glasses. The arms of the clamps for holding the glasses must be inclined the one relative to the other. Herefrom resulted up to the present the requirement to recut the female screw-thread for the clamping screw in order that this screw could be screwed-in obliquely to the plane of the arms. The result was that the screw-threaded hole could be easily spoiled. According to the application it is merely necessary to slightly rub up the hole in the clamp arm through which the nut extends in order to ensure a correct seat for the nut.

Finally, the new manner of fixation of the frame elements enables also a very simple securing against self-loosening of the screw. It is only necessary to make the fixation screw so short that it does not fill the whole length of the female thread in the conical nut and to screw-in from the opposite side a short safety screw. In this manner the principle of the counternuts well known in machine construction is utilised.

An embodiment of the invention is illustrated by way of example in the accompanying drawing, in which Fig. 1 shows a rimless spectacle with the frame elements fixed on the glasses according to the invention, Fig. 2 shows the fixation on larger scale, Fig. 3 shows how the fixation screw is secured in its position.

The clamps 2 for the frame and for the temple bars and the nose bow are fixed on the glasses 1 as shown in Fig. 1. A clamp according to the invention is shown on enlarged scale in Fig. 2. The clamp arms are pierced at opposite points for accommodating the fixation screw 3 or the conical nut 4 for the same. The holes pierced in the glass 1 are conical at the end destined to receive the conical nut 4. The conical portion of the hole 5 corresponds to the outer wall of nut 4. When the screw is tightened the whole outer wall of nut 4 is pressed slightly against the conical wall of bore 5 and effects thus a secure seat of the glass. In this manner the glass is securely held by means of the conical nut 4 and the conical portion 5 of the hole between the wall of the hole and the outer edge. Experiments have shown that the connection does not loosen even when the spectacles or eye glasses have been used for a longer time.

In order to make the contact surface between the conical nut 4 and the conical wall 5 of the hole as large as possible, it is advisable to make the conical portion of the hole so long that it extends over about three quarters of the thickness of the glass.

The screw connection is carried out as follows: The conical nut is first pushed into the hole in the glass from one side through the clamp, whereupon the screw 3 is inserted from the other side and screwed into the nut. The screw leaves free a portion of the female thread in nut 4, as shown in Fig. 3. Into this free portion of the female thread in nut 4 a counter-screw 6 is screwed in order to produce a safety effect. Finally, the portion of nut 4 and the end of the counter-screw 6 which project from the outer end of the clamp arm are milled off. As shown in Fig. 3, the flanges 7 of the screw thread in screw 3 directed towards the head of the screw press against the corresponding flanges of the female thread in nut 4. In the counter-screw 6, however, those flanges which are directed towards the head of the counter-screw are pressed against the corresponding flanges of the female thread in nut 4. These flanges are designated by 8. In this manner the friction of both screws in the screw-threaded bore is so strongly increased, as is known from counter-nuts, that they cannot easily get loose. Experiments have shown that by strongly tightening screw 3 it is even possible to fix the screws so that they cannot any more be unscrewed by hand.

If the clamp connection has to be detached, a thin cut is made into the outer end of the counter-screw 6 so that the fixation screw 3 as well as the counter-screw 6 can be removed by means of a screw driver.

I claim:

In an ophthalmic mounting, a lens and edge clamp therefor having clamp arms at opposite sides of the lens, the clamp arms and lens having a continuous bore therethrough, one end of said bore being of continuous uninterrupted conical formation extending through one of said clamp arms and substantially through three-quarters the thickness of said lens, a conical nut mounted in the conical end of the bore and having a taper complemental to the taper of the conical bore in the clamp arm and lens, a fixation screw extending through the other end of the bore for engagement with said nut, the head of the fixation screw directly engaging the other clamp arm and the threaded end of the screw terminating inwardly of the outer end of the nut and a counter screw threaded in the outer open end of the bore of the conical nut for abutting engagement with the fixation screw.

WILLI LOHMANN.